United States Patent [19]
Stillwagon et al.

[11] Patent Number: 5,272,894
[45] Date of Patent: Dec. 28, 1993

[54] FRACTIONAL-ROTATION LATCHING SYSTEM WITH RETROFIT CAPABILITY

[75] Inventors: Woodrow C. Stillwagon, Atlanta; Jeffrey R. Kuester, Marietta, both of Ga.

[73] Assignee: Star Lock Systems, Inc., Columbus, Ohio

[21] Appl. No.: 751,879

[22] Filed: Aug. 28, 1991

Related U.S. Application Data

[63] Continuation-in-part of Ser. No. 694,103, May 1, 1991, abandoned, and a continuation-in-part of Ser. No. 698,917, May 13, 1991, Pat. No. 5,197,314.

[51] Int. Cl.⁵ .......................................... B60R 25/02
[52] U.S. Cl. .......................................... 70/208; 70/34; 292/251
[58] Field of Search .................. 70/208, 135, 140, 14, 70/34, 386, 387, 491, 224; 292/251, 57–62; 403/325

[56] References Cited

U.S. PATENT DOCUMENTS

| | | | |
|---|---|---|---|
| 951,836 | 3/1910 | Noack | 403/383 |
| 1,234,212 | 7/1914 | Renaux . | |
| 1,499,444 | 1/1923 | Caillors . | |
| 1,577,678 | 4/1925 | Behrman . | |
| 1,592,696 | 7/1926 | Heyer | 70/34 |
| 1,829,760 | 12/1928 | Santiago . | |
| 1,975,877 | 4/1933 | Thomas | 279/93 |
| 2,062,628 | 1/1935 | Yannetta | 287/58 |
| 2,514,760 | 9/1948 | Hanson et al. | 294/102 |
| 2,826,855 | 11/1956 | Troceia | 43/44.83 |
| 3,089,329 | 5/1963 | Kerr | 70/135 |
| 3,089,330 | 5/1963 | Kerr | 70/140 |
| 3,111,833 | 11/1963 | Dettmer . | |
| 3,122,012 | 2/1964 | Christopher | 70/208 |
| 3,177,543 | 4/1965 | Fountain | 24/126 |
| 3,186,196 | 6/1965 | Moberg | 70/34 |
| 3,213,654 | 10/1965 | Davenbaugh et al. | 70/208 |
| 3,222,899 | 12/1965 | Bodoh et al. | 70/140 |
| 3,234,765 | 2/1966 | Kerr | 70/208 |
| 3,240,519 | 9/1966 | Weasler | 287/119 |
| 3,260,541 | 9/1966 | Sadler et al. | 287/53 |
| 3,285,043 | 11/1966 | Davenbaugh | 70/208 |

(List continued on next page.)

FOREIGN PATENT DOCUMENTS

| | | | |
|---|---|---|---|
| 196185 | 2/1958 | Australia | 24/115 L |
| 26634 | 11/1963 | Fed. Rep. of Germany | 70/208 |
| 2633669 | 2/1977 | Fed. Rep. of Germany | 70/386 |
| 414816 | 9/1934 | United Kingdom . | |
| 1121898 | 7/1968 | United Kingdom | 70/208 |

OTHER PUBLICATIONS

Quick Acting Fasteners for Removable Panels, Covers, and Sub Assemblies DZVS Fastener Co. Inc.
Caulking Gun Sketches and Explanation.
Sketch of T–Handle Assembly with Hex Recess and Washer.

Primary Examiner—Peter M. Cuomo
Assistant Examiner—Suzanne L. Dino
Attorney, Agent, or Firm—Louis T. Isaf

[57] ABSTRACT

A fractional-rotation latching system with retrofit capability which includes, in its most preferred embodiment with reference to an example vending machine environment, a T-handle housing to be connected to a vending machine door, a T-handle designed to be nested at least partially within the T-handle housing, a key-operated cylinder lock contained within the T-handle and including a radial lock bolt, a fractional-rotation post member connected to the T-handle, corresponding receiving assembly connected to the vending machine frame for receiving the post member, thereby creating a link sufficient to secure the vending machine door to the vending machine frame, a rotation limitation assembly connected to the post member which includes a cam washer and a flanged washer located within the T-handle housing, and a guide block interposed between the post member and the T-handle to secure a continuously engaging connection between the post member and the T-handle and to limit axial movement between the T-handle and the T-handle housing to an arrangement where the lock bolt is readily externally accessible.

45 Claims, 8 Drawing Sheets

U.S. PATENT DOCUMENTS

| | | | |
|---|---|---|---|
| 3,299,678 | 1/1967 | Spencer | 70/208 |
| 3,302,434 | 2/1967 | Davenbaugh et al. | 70/208 |
| 3,438,227 | 4/1969 | Wolniak | 70/208 |
| 3,478,548 | 7/1969 | Finck, Jr. | 70/397 |
| 3,507,508 | 4/1970 | Andrews | 279/83 |
| 3,525,242 | 8/1970 | Young | 70/231 |
| 3,550,412 | 12/1970 | Pitel et al. | 70/461 |
| 3,659,444 | 4/1972 | Wellekens | 70/360 |
| 3,738,134 | 6/1973 | Hall | 70/86 |
| 3,779,037 | 12/1973 | Petros et al. | 64/5 |
| 3,911,534 | 10/1974 | Martens et al. | 24/150 |
| 3,947,930 | 4/1975 | Martens et al. | 24/155 |
| 3,948,362 | 4/1975 | Greest | 188/65.2 |
| 3,974,581 | 4/1975 | Martens et al. | 40/20 |
| 3,994,521 | 11/1976 | Van Gompel | 292/319 |
| 4,012,813 | 3/1977 | Martens et al. | 24/150 |
| 4,132,092 | 1/1979 | Steinbach | 70/208 |
| 4,141,117 | 2/1979 | Van Gompel | 24/136 |
| 4,165,195 | 8/1979 | Teramachi | 403/359 |
| 4,198,080 | 4/1980 | Carpenter | 285/277 |
| 4,221,025 | 9/1980 | Martens et al. | 24/150 |
| 4,236,395 | 12/1980 | Avaiusini | 70/34 |
| 4,328,687 | 4/1982 | Ritchie | 70/34 |
| 4,361,196 | 11/1982 | Hoyle | 175/320 |
| 4,440,005 | 8/1983 | Bulle | 70/14 |
| 4,476,699 | 10/1984 | Dahlborg | 70/208 |
| 4,527,310 | 7/1985 | Vandebult | 24/150 |
| 4,548,060 | 10/1985 | Campbell | 70/91 |
| 4,552,001 | 11/1985 | Roop | 70/208 |
| 4,579,476 | 4/1986 | Post | 403/322 |
| 4,617,844 | 10/1986 | Batten | 81/436 |
| 4,637,234 | 1/1987 | Mielonen | 70/34 |
| 4,639,163 | 1/1987 | Buthe | 403/322 |
| 4,656,698 | 4/1987 | Arakaws | 24/136 |
| 4,683,739 | 8/1987 | Hughes | 70/363 |
| 4,711,106 | 12/1987 | Johnson | 70/34 |
| 4,716,749 | 1/1988 | Johnson | 70/363 |
| 4,730,468 | 3/1988 | Becker | 70/34 |
| 4,760,721 | 8/1988 | Steinbach | 70/208 |
| 4,796,930 | 1/1989 | Baynes | 292/58 |
| 4,834,573 | 5/1989 | Asano et al. | 403/344 |
| 4,859,110 | 8/1989 | Dommel | 403/325 |
| 4,865,485 | 9/1989 | Finnefrock, Sr. | 403/322 |
| 4,883,255 | 11/1989 | Bacon | 254/266 |
| 4,893,810 | 1/1990 | Lee | 272/123 |
| 4,898,523 | 2/1990 | Harwath | 418/70 |
| 4,899,561 | 2/1990 | Myers | 70/208 |
| 4,900,182 | 2/1990 | Stillwagon | 403/325 |
| 4,911,573 | 3/1990 | Pietro | 403/349 |
| 4,927,286 | 5/1990 | Hobluigie et al. | 403/322 |
| 4,946,130 | 8/1990 | Kooiman | 251/95 |
| 4,966,018 | 10/1990 | Hauber | 70/208 |
| 4,974,888 | 12/1990 | Childers | 292/251 |
| 4,993,247 | 2/1991 | Minemura | 70/208 |
| 5,022,243 | 6/1991 | Embey et al. | 70/34 |
| 5,027,630 | 7/1991 | Stillwagon et al. | 70/391 |
| 5,050,413 | 9/1991 | Stillwagon et al. | 70/386 |
| 5,197,314 | 3/1993 | Stillwagon et al. | 70/386 |

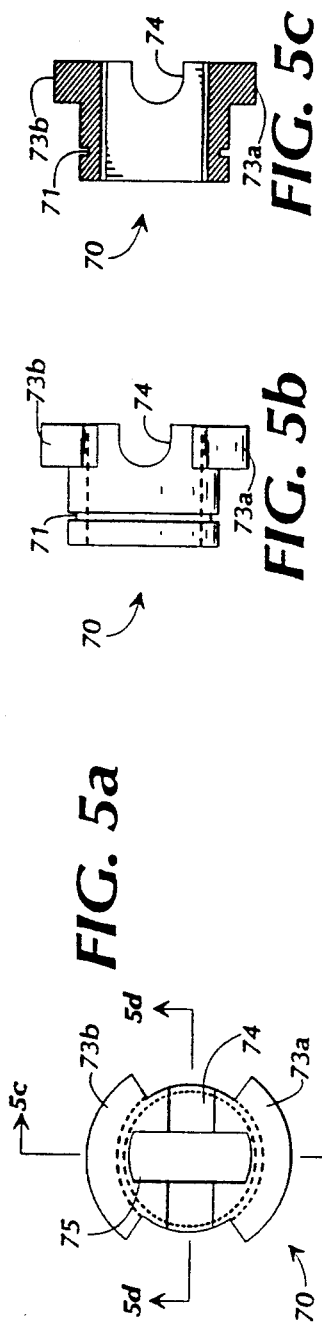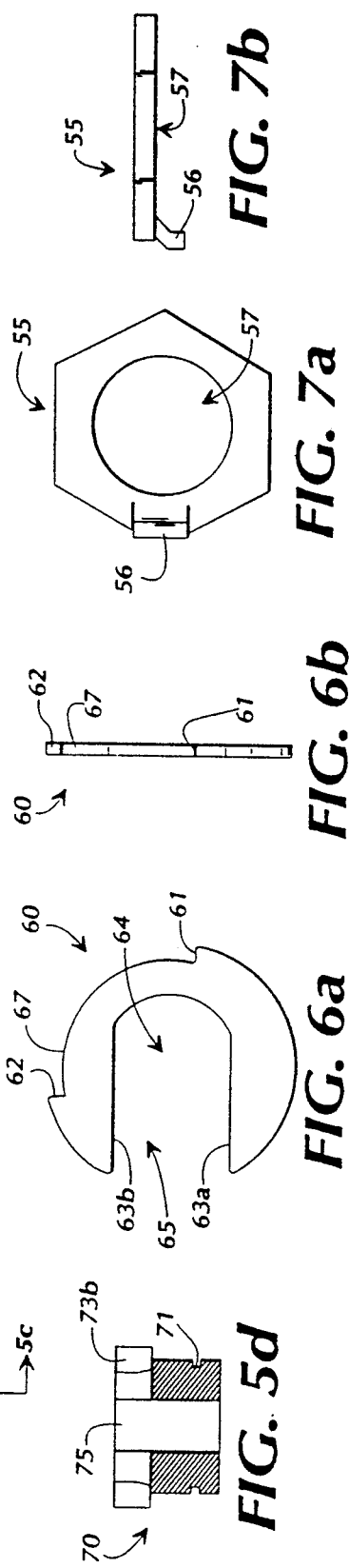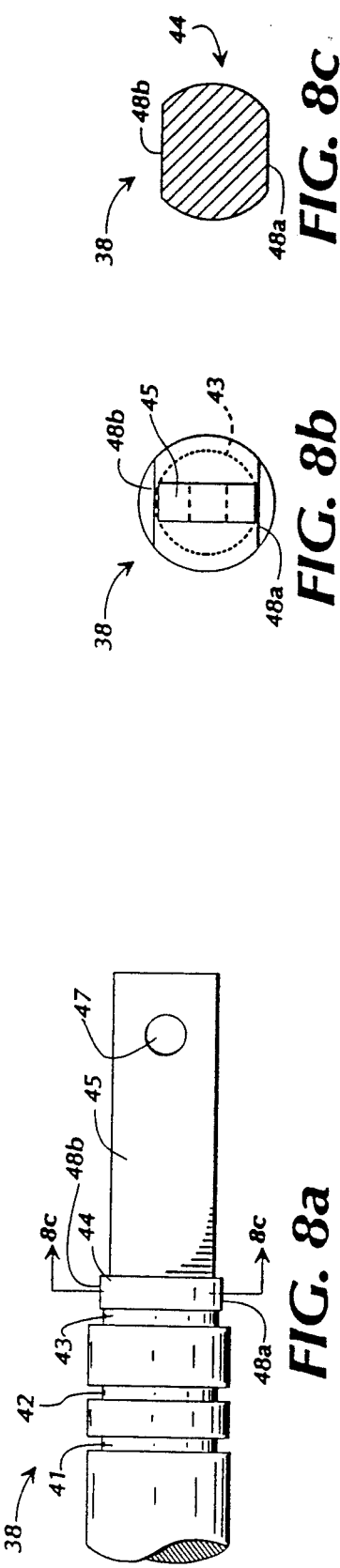

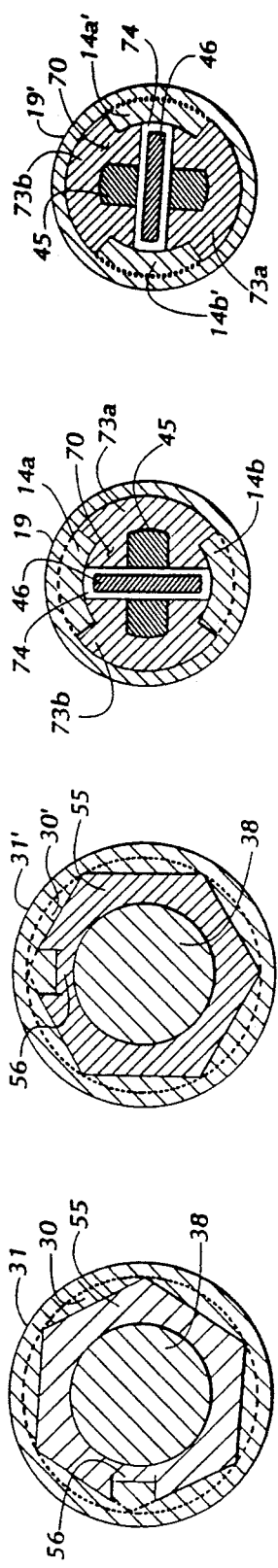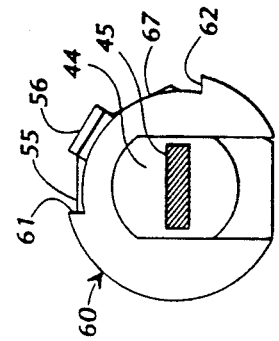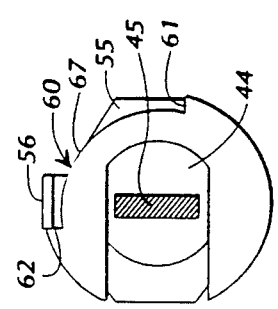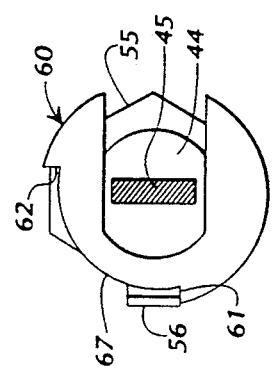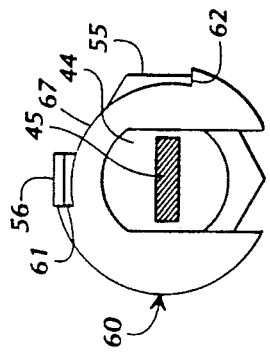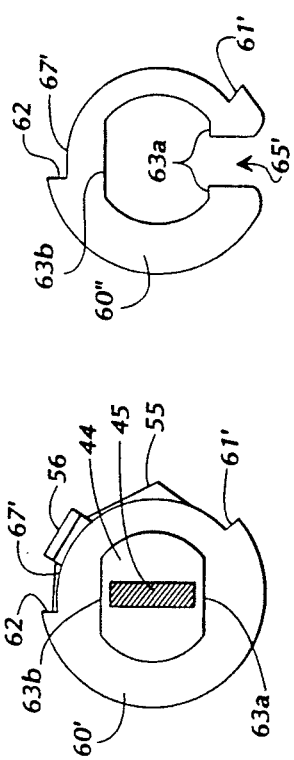

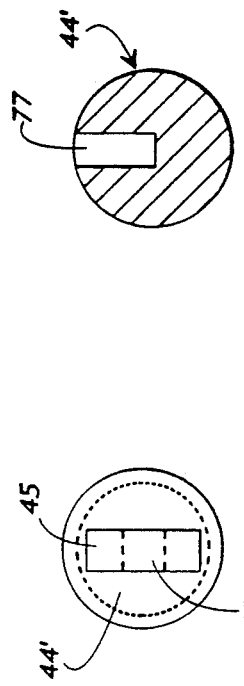
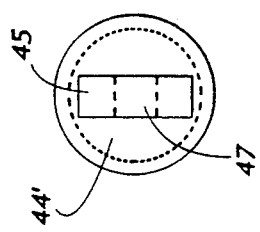
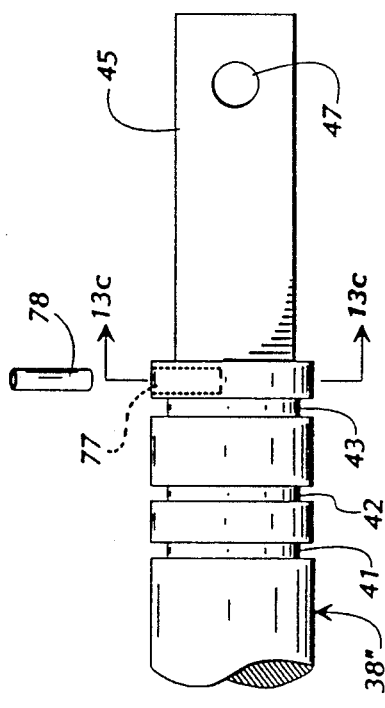
FIG. 13c
FIG. 13b
FIG. 13a
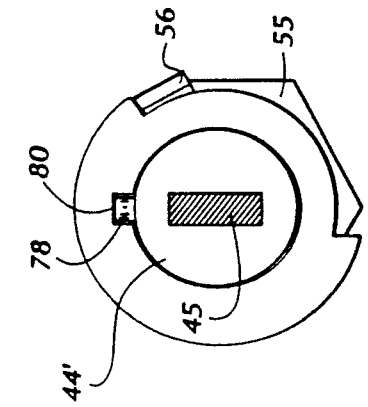
FIG. 15b
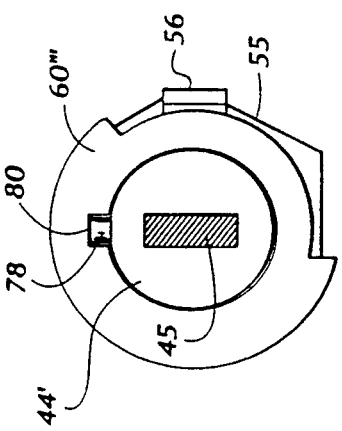
FIG. 15a
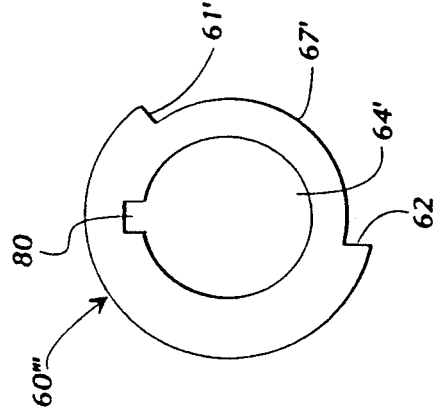
FIG. 14

FRACTIONAL-ROTATION LATCHING SYSTEM WITH RETROFIT CAPABILITY

CROSS-REFERENCES TO RELATED APPLICATIONS

This application is a continuation-in-part of application Ser. No. 07/694,103, filed May 1, 1991, and now abandoned, and application Ser. No. 07/698,917, filed May 13, 1991, and now U.S. Pat. No. 5,197,314.

BACKGROUND OF THE INVENTION

The present invention relates generally to the field of latching systems and, in its most preferred embodiments, to the field of key operated, T-handle latching systems for use in vending machines.

A latching system secures a link between two or more bodies. It is well known that the strength and precision of this connection, as well as the speed and ease with which it can be both established and disengaged, are factors which affect the usefulness of a latching system. By way of example, but not limitation, one environment which requires a latching assembly to perform well with respect to each of these factors is that of vending machines. A vending machine door and the frame to which it is attached are two bodies which require a link that is strong and precise, as well as one which can be both created and disengaged both quickly and easily. Many vending machines contain money boxes and currency validators which attract hordes of vandals attempting to illegally access the machines; therefore, vending machines require latching systems which provide very strong links. Also, many vending machines are actually large refrigerated containers and, therefore, require a good seal which results from a precise connection. Furthermore, vending machines require frequent attention by service operators who replenish the supply of vendable items and collect money. The speed and ease with which the latching system may be operated are factors which affect the operator's productivity and efficiency.

One well-known type of latching system frequently used in the vending machine field is the common T-handle system. This type of latching system typically includes a T-handle housing connected to the vending machine door, a T-handle nested therein, a key-operated cylinder lock contained within the T-handle, a post member connected to the T-handle, and a receiving assembly connected to the vending machine frame for receiving the post member, thereby a link. In unlatching a typical T-handle assembly, rotation of a key causes a lock bolt of the cylinder lock to retract, allowing a spring to extend a nested T-handle from within a T-handle housing. Upon extension, the T-handle may be rotated by the operator to release the post member from the receiving assembly, thus allowing the door to be opened. A few typical T-handle systems are disclosed in the following U.S. Pat. Nos.: 3,089,329, 3,089,330, 3,111,833, 3,122,012, 3,213,654, 3,222,899, 3,234,765, 3,285,043, 3,299,678, 3,302,434, 3,550,412, 4,552,001.

The post member and receiving assembly incorporated by many of the common T-handle systems include a post member with a threaded distal end and a receiving assembly which includes a correspondingly threaded nut. Although many of these screw & nut systems provide strong and precise links, the amount of time and degree of effort required to create and disengage the links through repetitively rotating the T-handle are drawbacks to many of these systems. This problem was at least partially addressed in U.S. Pat. No. 4,974,888, which disclosed a faster-acting receiving assembly which reduced the amount of time required to create a link. However, because the post member still required "unscrewing", the amount of time required to disengage the link was not significantly reduced by the device therein disclosed.

Other common T-handle systems, such as that disclosed in U.S. Pat. No. 3,234,765, utilize a cam-type (quarter-turn) post member along with a locking cam and an inclined locking shoulder connected to the door frame. This type of latching system only requires the T-handle to be rotated through a fraction of a turn to alternately create or disengage a link. Although quick-releasing, one drawback of this type of latching system is that the vending machine door must first be placed in contact with the vending machine frame before the T-handle can be rotated to create a secured link. In other words, unlike the quick-receiving latching system discussed above with reference to U.S. Pat. No. 4,974,888, the linking process disclosed in U.S. Pat. No. 3,234,765 does not include the option of first pushing the T-handle into the T-handle housing so that the lock bolt extends to secure the nesting and then simply closing the door, thereby transferring the axial force used to close the door into force which directly accelerates the linking process. Furthermore, many cam-type latching systems provide less security than other types of latching systems.

In an attempt to provide latching systems which overcome these and other problems, the inventor of the present invention has previously invented several quick-acting latching systems, some embodiments of which utilize a T-handle assembly (and others which do not), including U.S. patent Ser. No. 07/358,888, filed May 30, 1989, allowed Apr. 23, 1990, now U.S. Pat. No. 5,027,630, and U.S. patent Ser. No. 07/403,665, filed Sep. 6, 1989, allowed Oct. 16, 1990 and now U.S. Pat. No. 5,022,243. These latching systems are what shall be referred to herein as fractional-rotation latching systems which are quick-acting with respect to both creating and dissolving a link and are also systems which transfer door closure force directly into force which accelerates the linking process and strengthens the resulting link. Because of the abundance of T-handle systems currently being used in vending machines throughout the world, especially those utilizing the screw & nut method, there is a need to be able to retrofit those systems with quick-acting systems, thus utilizing the various existing T-handles and T-handle housings. In furtherance of this objective, several problems exist in adapting the various typical T-handle systems.

Because of the prevalence of the T-handle systems which utilize the screw & nut method, operators frequently assume that a particular T-handle is to be continuously rotated to unscrew the post member. Because the present inventor's previously patented latching systems do not employ the typical screw & nut method, continuous rotation of a T-handle in those inventions is a waste of time. There is, therefore, a need in the industry to provide a means of identifying to an operator whether a particular T-handle assembly requires continuous rotation or whether mere fractional rotation will suffice.

One of the objects of the present invention is to provide a retrofit-capable, latching system which mechanically identifies the latching system to an operator as a fractional-rotation latching system by limiting the amount of allowable relative rotation between the T-handle and T-handle housing. With respect to the previously discussed cam-type (quarter-turn) latching system, as disclosed in U.S. Pat. No. 3,234,765, a cam washer is used in conjunction with a stop pin extending exteriorly from the T-handle housing to limit the amount of allowable rotation. However, many currently existing T-handle housings which utilize the screw & nut method, thus having no clearly inherent reason to limit rotation, do not include an externally extending stop pin. Therefore, the rotation-limiting device disclosed in that patent could not be used with many of the existing T-handle housings which do not include an externally extending stop pin.

Another aspect of many of the T-handle systems which employ the screw & nut method relates to the lost motion feature. During closure, after the seal has become sufficiently tight through rotation of the T-handle, the T-handle may not be in alignment with the T-handle housing. Further turning of the T-handle in the tightening direction, in order to align the T-handle with the T-handle housing, often requires an inordinate amount of rotation force, but rotation of the T-handle in the un-tightening direction to align the T-handle and T-handle housing often unacceptably reduces the pressure on the seal. Many of the common T-handle systems solve that problem through providing a lost motion connection between the T-handle and the post member, as disclosed in U.S. Pat. No. 3,122,012. This feature allows for a limited degree of reverse rotation after tightening so that the T-handle may be aligned with and then pushed into the T-handle housing This reverse rotation is disassociated from the post member so that the post member remains in a tight configuration, hence the lost motion.

This lost motion function is frequently accomplished through interaction between a pair of clutch lugs attached to the rear bearing wall of the T-handle and a clutch pin attached to the post member. The clutch pin is allowed to rotate freely between the clutch lugs so that a certain amount of "slop" is provided for the lost motion function. The rear passageway in the T-handle is also regularly circular, thus providing no restriction against this relative rotation between the T-handle and the post member. By contrast, in fractional-rotation latching systems, the presence of "slop" is detrimental to the latching system's reliable operation. There exists, therefore, a need for a device which will remove this "slop" and provide for a more continuous rotational connection between a post member and a variety of the existing T-handles.

U.S. Pat. No. 4,552,001, discussed above, discloses a T-handle which does not contain the common clutch lugs, but provides a square-shaped passageway which interacts with a cam-type post member which has a segment with an axially extending square cross-sectional profile. Although the T-handle and post member are in continuous rotational connection, many common T-handles include a regularly circular rear passageway rather than this irregularly-shaped rear passageway. There is a need, therefore, to provide a retrofit-capable device for eliminating "slop" in many of the currently existing T-handle assemblies.

SUMMARY OF THE INVENTION

Briefly described, the fractional-rotation latching system with retrofit capability of the present invention includes, in its most preferred embodiment with reference to an example vending machine environment, a T-handle housing to be connected to a vending machine door, a T-handle designed to be at least partially nested within the T-handle housing, a key-operated cylinder lock contained within the T-handle, a fractional-rotation post member connected to the T-handle, corresponding receiving assembly connected to the vending machine frame for receiving the post member, thereby creating a link sufficient to secure the vending machine door to the vending machine frame, a rotation limitation assembly connected to the post member which includes a cam washer and a flanged washer located within the T-handle housing, and a guide block interposed between the post member and the T-handle to secure a continuously engaging connection between the post member and the T-handle and to limit axial movement between the T-handle and the T-handle housing to an arrangement where the lock bolt is readily externally accessible.

It is, therefore, an object of the present invention to provide a quick-acting, fractional-rotation latching system.

Another object of the present invention is to provide a fractional-rotation latching system with a retrofit capability.

Another object of the present invention is to provide a fractional-rotation latching system which includes an assembly for mechanically indicating, upon operation, that the latching system is a fractional-rotation latching system.

Another object is to provide such an invention which provides indication through limiting the amount of allowable relative rotation between a handle and a handle housing.

Another object of the present invention is to provide a fractional-rotation latching system which includes a receiving assembly for directly gripping a gripping surface of a post member to create a link between two bodies and an assembly which defines limits of allowable rotation of the post member.

Another object is to provide such an invention wherein the rotation-limiting assembly includes a cam washer and a flanged washer connected around the post member and located within a T-handle housing.

Another object of the present invention is to provide a fractional-rotation latching system which includes an assembly for indicating, through limiting the amount of allowable relative rotation between a handle and a handle housing, that the latching system is a fractional-rotation latching system, which assembly includes a cam washer and a flanged washer connected around a post member and located within the handle housing.

Another object is to provide such an invention wherein the cam washer includes a central passageway and a radial passageway extending therefrom which enables an operator to connect the cam washer around the post member from a side position rather than needing to insert one end of the post member through the central passageway of the cam washer.

Another object of the present invention is to provide an assembly for limiting the amount of relative rotation between a handle and a handle housing which assembly is constructed so as to be connected around a post member and located inside a handle housing of a latching system.

Another object is to provide such an invention which includes a cam washer connected to receive rotation force from and rotate in conjunction with the post member and a flanged washer which is connected to rotate freely relative to the post member, is located at least partially within a recess within the handle housing to receive resistance force from the handle housing, and is in contact with the cam washer.

Yet another object of the present invention is to provide a fractional-rotation latching system which includes a T-handle which includes a rear bearing wall which includes clutch lugs and defines a circular rear passageway through which a guide block protrudes, which guide block includes block lugs in continuous contact with the clutch lugs to receive rotation force from the T-handle whenever the T-handle is rotated.

Yet another object is to provide such an invention wherein the guide block defines a non-circular central passageway through which a non-circular section of a post member protrudes, thereby receiving rotation force from the guide block.

Yet another object is to provide such an invention wherein the guide block defines a roll pin valley for receiving a roll pin attached to one end of the post member to maintain a connection between the post member and the guide block, wherein the roll pin valley is deep enough to allow enough extension of the T-handle to provide access to a lock bolt of a cylinder lock located within a front end of the T-handle.

Still another object of the present invention is to provide a fractional-rotation latching system for linking a first body and a second body which includes, at least, a handle housing which is attachable to the first body, a handle which is designed to be at least partially nested within the handle housing, a fractional-rotation post member connected to the handle, a corresponding receiving assembly for releasably gripping the post member to create a link between the first body and the second body, an assembly for indicating, upon operation, that the latching system is a fractional-rotation latching system, and a guide block interposed between the post member and the handle.

Still another object of the present invention is to provide a retrofit assembly which utilizes the T-handle and T-handle housing of an existing T-handle assembly and replaces the post member assembly and receiving assembly, thus providing a quick-action, fractional-rotation latching system.

Still another object is to provide such an invention wherein the post member assembly includes a post member, an assembly for limiting relative rotation between the T-handle and the T-handle housing, and a guide block to connect the post member to the T-handle.

Other objects, features and advantages of the present invention will become apparent upon reading and understanding the present specification, when taken in conjunction with the accompanying drawings.

BRIEF DESCRIPTION OF THE DRAWINGS

FIG. 5a is an isolated front view of the guide block of FIG. 1.

FIG. 5b is an isolated side view of the guide block of FIG. 5a.

FIG. 5c is an isolated cross-sectional side view of the guide block of FIG. 5a taken along line 5c—5c of FIG. 5a.

FIG. 5d is an isolated cross-sectional side view of the guide block of FIG. 5a taken along line 5d—5d of FIG. 5a.

FIG. 6a is an isolated rear view of the cam washer of FIG. 1.

FIG. 6b is an isolated side view of the cam washer of FIG. 1.

FIG. 7a is an isolated front view of the flanged washer of FIG. 1.

FIG. 7b is an isolated top view of the flanged washer of FIG. 1.

FIG. 8a is an isolated side view of the front end of the post member of FIG. 1.

FIG. 8b is an isolated end view of the front end of the post member of FIG. 1.

FIG. 8c is an isolated cross-sectional end view of the post member of FIG. 1 taken along line 8c—8c of FIG. 8a.

FIG. 9a is a cross-sectional end view of the present invention as shown in FIG. 3 taken along line 9a—9a of FIG. 3.

FIG. 9b is a cross-sectional end view similar to FIG. 9a showing an alternate embodiment of the T-handle housing and an alternate orientation of the flanged washer.

FIG. 10a is a cross-sectional end view of the present invention as shown in FIG. 3 taken along line 10a—10a of FIG. 3.

FIG. 10b is a cross-sectional end view similar to FIG. 10a showing an alternate embodiment of the T-handle and an alternate orientation of the post member assembly.

FIG. 11a is a cross-sectional end view of the present invention as shown in FIG. 3, without the T-handle housing, barrel spring, or klipring, taken along line 11a—11a of FIG. 3.

FIG. 11b is a cross-sectional end view similar to FIG. 11a showing alternate orientations for use with a T-handle housing such as the one depicted in FIG. 9b.

FIG. 11c is a cross-sectional end view similar to FIG. 11a showing alternate orientations for use with a T-handle such as the one depicted in FIG. 10b.

FIG. 11d is a cross-sectional end view similar to FIG. 11a showing alternate orientations for use with a T-handle housing such as the one depicted in FIG. 9b and a T-handle such as the one depicted in FIG. 10b.

FIG. 11e is a cross-sectional end view similar to FIG. 11a showing an alternate orientation of the flanged washer and cam washer and showing an alternate embodiment of the cam washer.

FIG. 11f is an isolated rear view of an alternate embodiment of a cam washer.

FIG. 13a is an isolated side view similar to FIG. 8a of a front end of a post member and a cam pin in accordance with another embodiment of the present invention.

FIG. 13b is an isolated end view of the front end of the post member of FIG. 13a.

FIG. 13c is an isolated cross-sectional end view of the postmember of FIG. 13a taken along line 13c—13c of FIG. 13a.

FIG. 14 is an isolated front view of a cam washer in accordance with the alternate embodiment of the present invention shown in FIG. 13a.

FIG. 15a is a cross-sectional end view similar to FIG. 11a in accordance with the alternate embodiment of the present shown in FIGS. 13a and 14.

FIG. 15b is a cross-sectional end view similar to FIG. 15a showing another orientation of the flanged washer.

DETAILED DESCRIPTION OF THE PREFERRED EMBODIMENT

Figure 1:
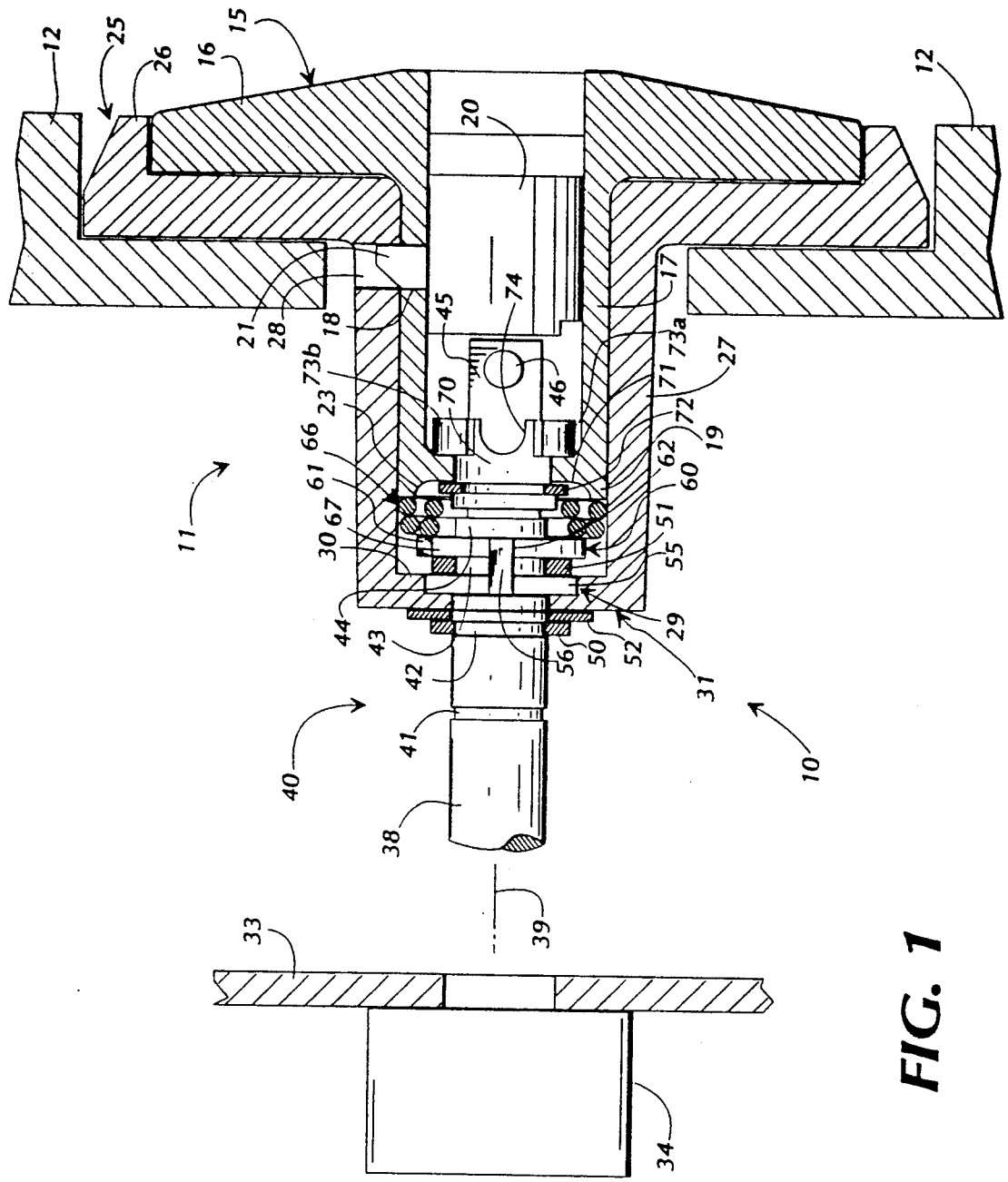
FIG. 1 is a cross-sectional side view of a Fractional-Rotation Latching System in accordance with the preferred embodiment of the present invention shown in a locked position.

Referring now in greater detail to the drawings in which like numerals represent like components throughout the several views, a preferred embodiment of the fractional-rotation latching system 10 of the present invention is seen in FIG. 1 as including a T-handle assembly 11 connected to door 12, post member assembly 40, and receiving assembling 34 connected to frame 33. In the preferred embodiment and in an example vending machine environment, door 12 and frame 33 represent a vending machine door and a vending machine frame to which the door is attached, respectively. T-handle assembly 11 is representative of a variety of common T-handle assemblies and is seen including T-handle housing 25 connected to door 12, T-handle 15, and lock assembly 20 located therein.

In the preferred embodiment, T-handle housing 11 defines a unitary construction and includes rectangular portion 26, middle portion 27, and housing bearing wall 31. Rectangular portion 26 is the portion of T-handle housing 11 which is connected to door 12. Common methods of creating this connection are considered known within the industry and include, at least, both threaded screws and spot welding. Furthermore, T-handle housing 25 is frequently included as an element in a larger face plate assembly attached to door 12. Middle portion 27 of T-handle housing 25 is seen including a housing lock bolt channel 28 wherein lock bolt 21 of lock assembly 20 is seen protruding. Housing bearing wall 31 is seen connected to middle portion 27 and bears most of the axial force from post member assembly 40. The post member assembly 40 and T-handle assembly 11 of FIG. 1 are shown in an exploded perspective view in FIG. 2 where housing bearing wall 31 is seen including a hex recess 29 formed by hex shoulder 30.

Figure 2:
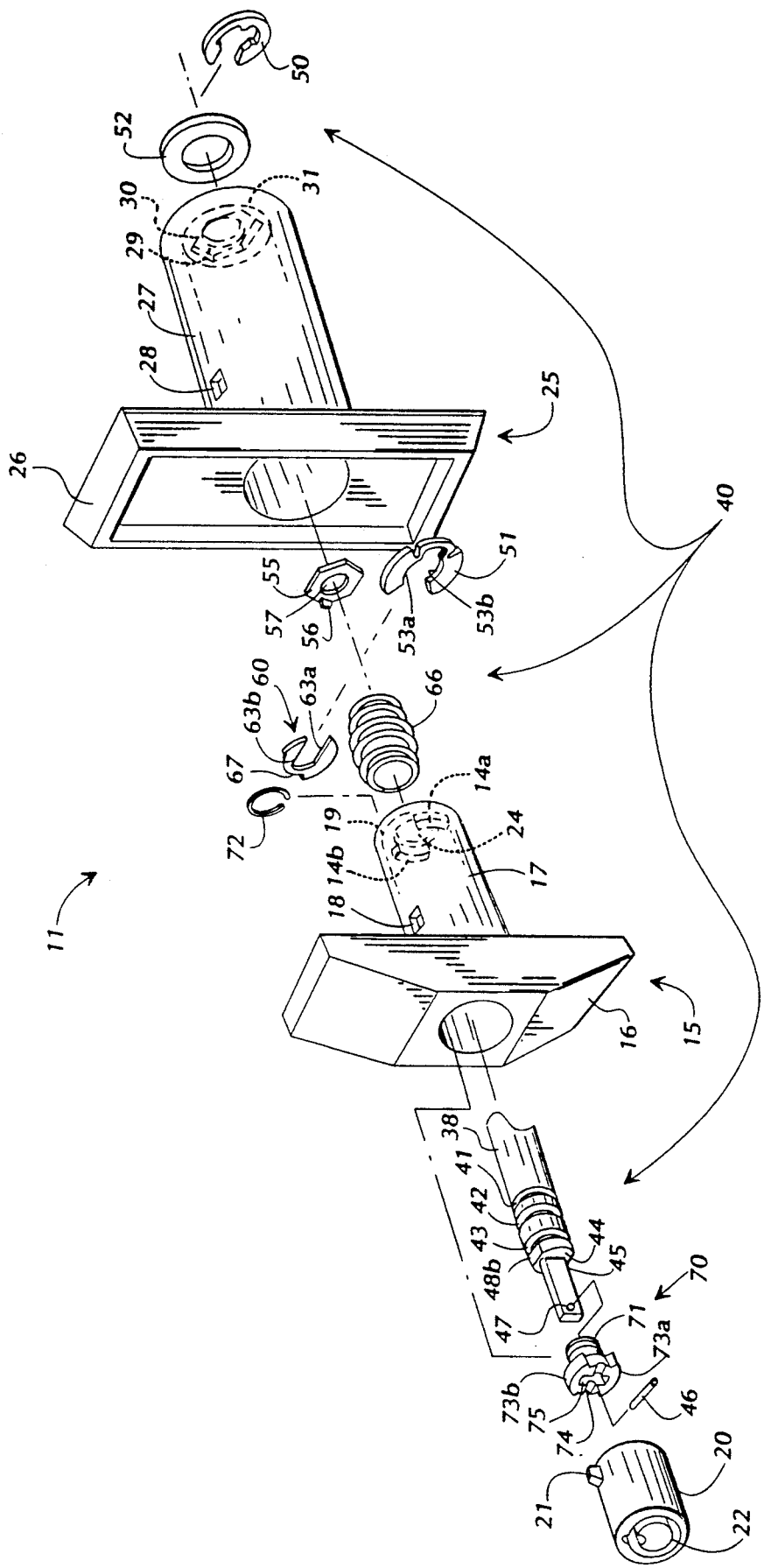
FIG. 2 is an exploded perspective view of the T-handle assembly and front end of the post member assembly of FIG. 1.

In FIG. 1, T-handle 15 is seen nested into T-handle housing 25 and includes grip section 16, cylinder section 17, and handle bearing wall 19. Cylinder section 17 includes handle lock bolt channel 18 through which lock bolt 21 of lock assembly 20 is seen protruding. Referring to FIGS. 1 and 2, handle bearing wall 19 includes clutch lugs 14a and 14b and defines a circular handle rear passageway 24 and handle rear recess 23. Lock assembly 20 remains within T-handle 15 and represents one of a variety of common cylinder locks which include a lock bolt 21 and key entry channel 22. It is understood that alternate embodiments of T-handle assembly 11 which define alternate shapes, dimensions, and orientations are within the scope of the present invention.

Post member assembly 40 is seen including post member 38 represented in a cut-away form. The distal end of post member 38, not shown, cooperates with receiving assembly 34 so that a link between door 12 and frame 33 is alternately created or disengaged through rotating post member 38 in alternate directions about its longitudinal post axis 39 for a fraction of a rotation. The distal end of post member 38 and the internal design of receiving assembly 34 of the preferred embodiment are fully disclosed and explained with reference to FIG. 1 and the "Operation" section of U.S. patent application Ser. No. 07/403,665, filed Sep. 6, 1989, allowed Oct. 16, 1990, U.S. Pat. No. 5,022,243, which specification and drawings are incorporated herein by reference. The distal end of post member 38 and the internal design of receiving assembly 34 of an alternate embodiment of the present invention are fully disclosed and explained with reference to the description of the bar and the ball and cam collar disclosed in U.S. Pat. No. 4,900,182, which specification and drawings are incorporated herein by reference. The distal end of post member 38 and the internal design of receiving assembly 34 of yet another alternate embodiment of the present invention are fully disclosed and explained with reference to the description of the locking cam and inclined shoulder disclosed in U.S. Pat. No. 3,234,765, which specification and drawings are incorporated herein by reference. The scope of the present invention includes distal ends of post member 38 and receiving assemblies 34 which require only a fractional rotation to function properly, and is not limited to the specific embodiments stated above.

FIG. 8a shows an isolated side view of the front end of post member 38 of the preferred embodiment of the present invention. The front end of post member 38 includes rear groove 41, middle groove 42, and front groove 43. Cam segment 44 is seen adjacent to front groove 43 and defined by flat cam surfaces 48a and 48b. Its cross-sectional profile is shown in FIG. 8c which is taken along lines 8c—8c of FIG. 8a. Coupling segment 45 is seen adjacent to cam segment 44. FIG. 8b shows a front end view which reveals the relatively extended rectangular shape of coupling segment 45. Pin hole 47 is also seen extending through coupling segment 45.

Referring back to FIGS. 1 and 2, E-ring 50 and klipring 51 are seen attached around post member 38 at middle groove 42 and front groove 43, respectively. These retention rings do not prevent rotation of post member 38 about its longitudinal post axis 39, but prevent substantial axial movement of post member 38 with respect to T-handle housing 25. E-ring washer 52 provides additional width to further restrict the aforementioned axial movement. Rear groove 41 is used in alternate embodiments of the present invention which utilize T-handle housings 25 with thicker rear bearing walls 31. FIG. 1 shows barrel spring 66 in a compressed state wherein, by virtue of its barrel feature, it collapses into itself to reduce the amount of axial space required when compressed.

Flanged washer 55 and cam washer 60 are also seen connected around post member 38. Flanged washer 55 is seen located within hex recess 29 formed by hex shoulder 30 of housing bearing wall 31. Referring also to FIG. 7a, which shows an isolated front view, flanged washer 55 defines a hex-shaped outer perimeter and a circular central passageway 57. The hex-shaped outer perimeter cooperates with the hex recess 29 in T-handle housing 25 to prevent flanged washer 55 from substantially rotating with respect to T-handle housing 25. This cooperation between a hex-shaped recess and a hex-shaped washer (without a flange member) is known in the prior art. The circular central passageway 57 enables post member 38 to rotate freely about longitudinal post axis 39. In FIG. 1, flange member 56 is seen extending from flanged washer 55 in a direction at least partially parallel to the longitudinal post axis 39 with an axial length sufficient to enable interaction with cam washer 60. Referring also to FIG. 7b, which shows an isolated top view of flanged washer 7b, the radial extension of flange member 56 is small enough to avoid interfering with the fit of flanged washer 55 within hex recess 29 of T-handle housing 25. Furthermore, flange member 56 extends in a manner which ensures interaction with klipring 51.

Referring now to FIGS. 1 and 2, cam washer 60 is seen connected around cam segment 44 of post member 38. Cam recess 67 is defined by bend flat surface 61 and leg flat surface 62. The details of these elements are seen more clearly by also referring to FIGS. 6a and 6b, which show isolated rear and side views, respectively, of cam washer 60 of the preferred embodiment of the present invention. Cam recess 67 is seen extending around the outer edge of cam washer 60 between bend flat surface 61 and leg flat surface 62. Cam washer 60 defines cam central passageway 64 and radial slot 65 which provides access from an edge of cam washer 60 to cam central passageway 64. Inner cam surfaces 63a and 63b are seen within cam central passageway 64 and are placed in contact with flat cam surfaces 48a & 48b of cam segment 44 when cam washer 60 is assembled around post member 38. Radial slot 65 enables cam washer 60 to be assembled directly onto cam segment 44 without having to pass around either end of post member 38.

Referring now to FIGS. 1, 2 and 5a-5d, guide block 70 is seen interposed between post member 38 and T-handle 15 and protruding through handle rear passageway 24. The axial position of guide block 70 within T-handle rear passageway 24 is secured by block lugs 73a and 73b and C-ring 72 which fits around guide block 70 at block groove 71 and into handle rear recess 23. Block lugs 73a and 73b are shaped to fit between clutch lugs 14a and 14b to secure the angular position of guide block 70 and to receive rotation force from clutch lugs 14a and 14b while preventing "slop" in the rotational connection between T-handle 15 and post member 38. Guide block 70 defines post slot 75 which extends axially through guide block 70 and has substantially the same shape as coupling segment 45 of post member 38 to transfer rotation force to post member 38.

Figure 3:
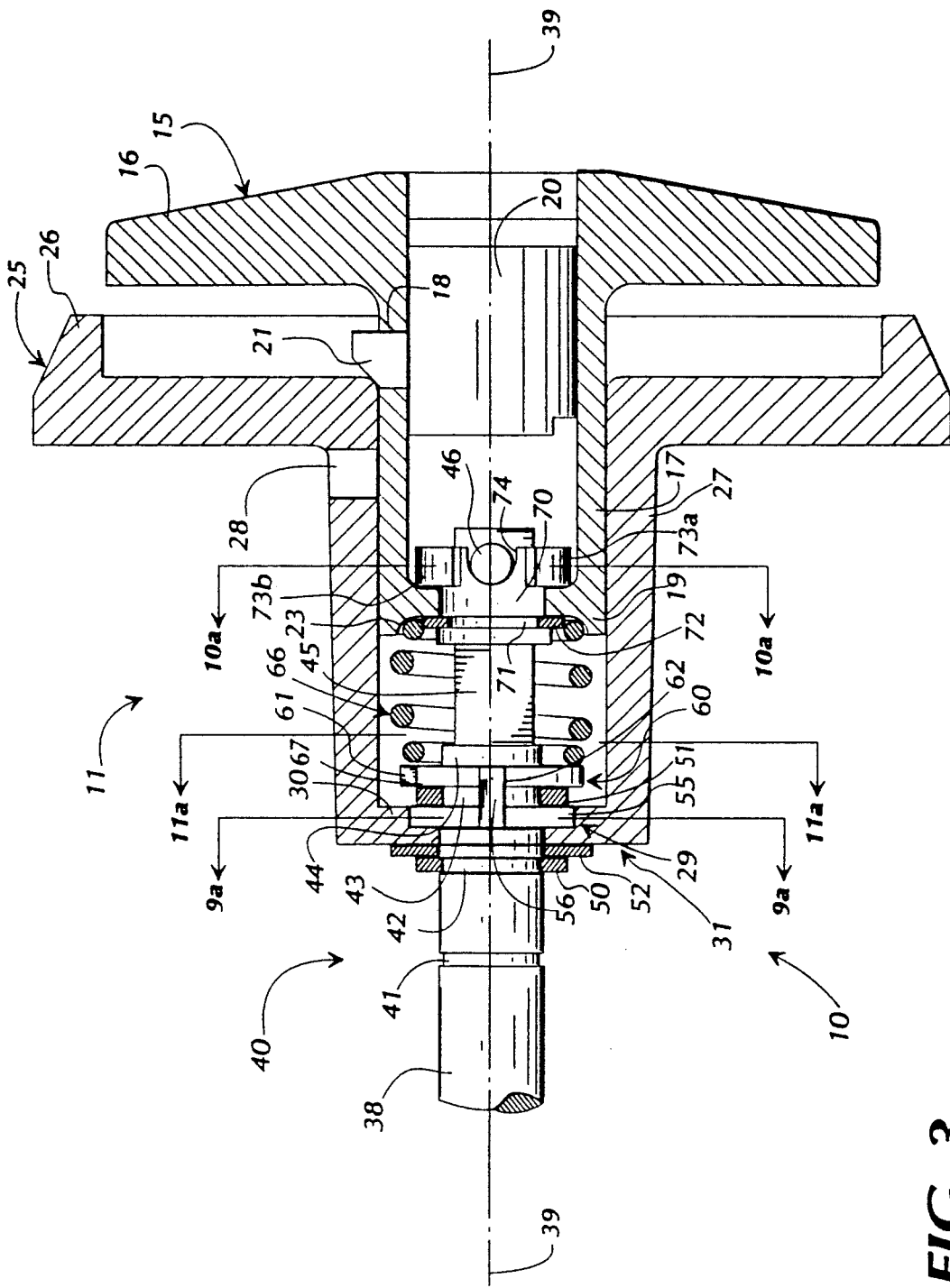
FIG. 3 is a cross-sectional side view of the front end of the post member assembly and the T-handle assembly of FIG. 1 shown in an un-locked position.

Pin valley 74 extends radially across the front end of guide block 70 to receive roll pin 46 when T-handle assembly 11 is in the un-locked state, as shown in FIG. 3. Roll pin 46 and cam segment 44 ensure that coupling segment 45 remains within post slot 75. The depth of pin valley 74, along with the length of coupling segment 45, determine how far T-handle 15 is allowed to extend during the un-locked state. In the preferred embodiment, T-handle 15 must be allowed to extend far enough to provide access to lock bolt 21 so that it may be depressed below handle lock bolt channel 18 which allows lock assembly 20 to be removed and replaced without necessitating disassembly of the latching system of the present invention. However, the standard length of cylinder section 17 of T-handle 15 limits the amount of axial distance between guide block 70 and the rear of lock assembly 20. Also, because of the standard overall length of many T-handle housings 25, the length of cam segment 44 is another factor which affects the length of coupling segment 45. During an attempted break-in, klipring 51, and thus cam segment 44, bear a large amount of force; therefore, cam segment 44 must have sufficient length to withstand this attempted security breach. Pin valley 74 must, therefore, be deep enough to ensure adequate extension of T-handle 15 in light of limitations such as these.

In the preferred embodiment, guide block 70 is manufactured through a powder metal process to achieve the required detailed shapes and edges. To assist in achieving the required depth of pin valley 74, yet avoid damaging the press used in the production of guide block 70 due to the resulting high density of guide block 70 below pin valley 74, the density of the powder metal before the pressing step is kept low.

OPERATION

Referring to FIG. 1, the preferred embodiment of fractional-rotation latching system 10 is shown in a locked position. Beginning with door 12 closed with respect to frame 33, receiving assembly 34 maintains a latched grip on post member 38 to prevent forced opening of door 12 from frame 33. T-handle assembly 11 is shown in a locked position wherein T-handle 15 is securely nested into T-handle housing 25 because lock bolt 21 protrudes into housing lock bolt channel 28. Furthermore, roll pin 46 is shown displaced from pin valley 74, and barrel spring 66 is shown in a compressed state. Finally, cam washer 60 is oriented so that flange member 56 of flanged washer 55 is located adjacent to leg flat surface 62.

In beginning the un-locking/un-latching procedure, an operator inserts and rotates a key within lock assembly 20 to cause lock bolt 21 to retract from housing lock bolt channel 28, thus allowing axial movement between T-handle 15 and T-handle housing 25. As soon as lock bolt 21 retracts from housing lock bolt channel 38, T-handle 15 is forced to extend out from T-handle housing 25 by the force from decompressing barrel spring 66. The distance travelled by T-handle 15 is limited by the distance between roll pin 46 and the bottom of pin valley 74, as is discussed above.

FIG. 3 shows the front end of post member assembly 40 and an un-locked T-handle assembly 11. T-handle 15 is extended from T-handle housing 25, providing complete access to grip section 16 and lock bolt 21. As discussed above, lock bolt 21 may then be manually compressed to allow removal of lock assembly 20. Roll pin 46 is seen resting within pin valley 74, thus maintaining a connection between T-handle 15 and post member 38. Barrel spring 66 is shown in a decompressed state, and the orientation of cam washer 60 remains unchanged. At this point, T-handle assembly 11 is in an un-locked position, yet post member 38 remains latched to the receiving assembly 34 of FIG. 1.

To un-latch post member 38, the operator grasps grips section 16 and subsequently supplies a rotation force around longitudinal post axis 39 (a counterclockwise rotation force for the orientation shown in FIG. 1). Referring also to FIG. 2, this rotation force is transferred to guide block 70 through clutch lugs 14a and 14b. Block lugs 73a and 73b immediately receive the rotation force, and through the rotation of guide block 70, transfer the rotation force to coupling segment 45 of post member 38 located within post slot 75. Because there is no "slop" in the connection between post member 38 and T-handle 15, post member 38 rotates in, substantially, complete conjunction with T-handle 15. After a predetermined amount of rotation, post member 38 is released from receiving assembly 38, thus un-latching the present invention to allow door 12 to be opened.

As a result of the rotation of post member 38, cam segment 44 rotates cam washer 60 through interaction between flat cam surfaces 48a and 48b of cam segment 44 and inner cam surfaces 63a and 63b of cam washer 60. During the rotation of cam washer 60, flange member 56 rides in cam recess 67 toward bend flat surface 61. In the preferred embodiment, after a quarter of a rotation, bend flat surface 61 collides with flange member 56. Because flanged washer 55 defines an outer hex shape which corresponds to the hex recess 29 of T-handle housing 25 wherein flanged washer 55 is located, and because flanged washer 55 defines circular central passageway 57 which does not restrict rotation of post member 38, flanged washer 55 remains substantially stationary with respect to T-handle housing 25. In some embodiments of the present invention, flange washer 55 is slightly smaller than hex recess 29, thus allowing a small amount of play.

One result of the relatively stationary positioning of flanged washer 55 is reduction in wear on housing bearing wall 19. Another result is the transfer of resistance rotation force (which may also be referred to as opposing, reactionary, or stationary force) to flange member 56 from T-handle housing 25. As bend flat surface 61 contacts and exerts rotation force on flange member 56 during rotation of post member 38, flange member 56 responds by supplying opposing resistance force to stop the movement of cam washer 60, thus preventing further rotation of post member 38 and T-handle 15. The non-circular outer shape of flanged washer 55 is thus utilized for at least two different purposes: reducing wear on T-handle housing 25 and assisting in limiting rotation of T-handle 15.

Figure 4:
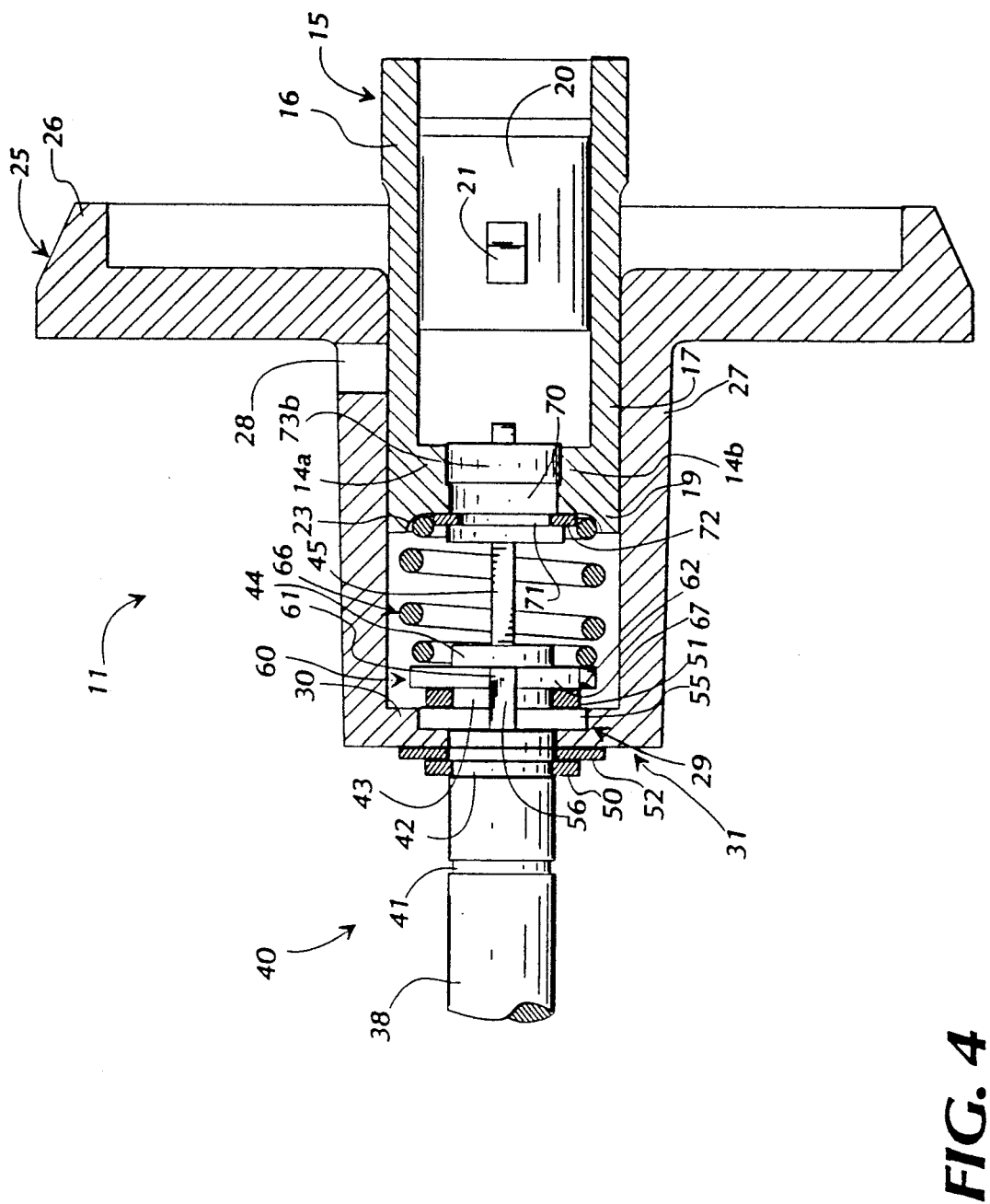
FIG. 4 is a cross-sectional side view of the front end of the post member assembly and the T-handle assembly of FIG. 1 shown in an un-locked/un-latched position.

This un-locked/un-latched position is represented in FIG. 4, which shows the front end of post member assembly 40 and T-handle assembly 11 in an un-locked-/un-latched position. T-handle 15 has been rotated through a quarter of a rotation, thus the small width of the rectangular grip 16, along with clutch lugs 14a and 14b are seen in FIG. 4. Referring also to FIG. 2, guide block 70 has been rotated so that roll pin 46 is no longer visible, and the small width of coupling segment 45 is seen. Furthermore, cam washer 60 is seen rotated so that bend flat surface 61 contacts flange member 56, and leg flat surface 62 is located on the bottom of cam washer 60.

In the preferred embodiment, after the vending machine has been serviced, the operator grasps the grip section 16 and rotates it in a clockwise direction to align T-handle 15 with T-handle housing 25. T-handle 15 is not allowed to rotate past this point due to similar interaction between leg flat surface 62 and flange member 56. This rotation results in the position shown in FIG. 3. The operator then pushes T-handle 15 into T-handle housing 25 against the yielding barrel spring 66 to the point where lock bolt 21 once again protrudes up through handle lock bolt channel 28 to secure T-handle 15 into T-handle housing 25. This compression action results in the position shown in FIG. 1. The vending machine may then be closed by simply closing door 12 which once again creates a link between receiving assembly 34 and post member 38. In the alternate embodiment discussed above which includes a locking cam and an inclined shoulder, the operator closes door 12 and then rotates grip section 16 and pushes T-handle 15 into T-handle housing 25.

ALTERNATE EMBODIMENTS AND ORIENTATIONS

Refer now to FIGS. 3 and 9-15b. FIG. 9a shows a cross-sectional end view of the present invention as shown in FIG. 3 taken along line 9a—9a of FIG. 3. Various T-handle housings 25 include housing bearing walls 31 with hex shoulder 30 oriented differently than that of FIG. 3. FIG. 9a shows the orientation of the embodiment shown in FIG. 3. Flanged washer 55, including flange member 56, is shown connected around post member 38 and located inside hex shoulder 30 of handle bearing wall 31 so that the upper edge of flanged washer 55 is horizontal. FIG. 9b shows an alternate embodiment of housing bearing wall 31' and hex shoulder 30' wherein the upper edge of flanged washer 55 is vertically, rather than horizontally, oriented. In the present invention, flanged washer 55 may be oriented by the operator to adapt to either of these orientations of hex shoulder 30. Furthermore, it should be understood that the scope of the present invention includes other alternate embodiments wherein flanged washer 55 and the recess in housing bearing wall 31 define other geometric shapes rather than a hex, such as, but no limited to, a triangle, a square, or a pentagon, or other means for preventing rotation of a flanged washer relative to a housing.

FIG. 10a shows a cross-sectional end view of the present invention as shown in FIG. 3 taken along line 10a—10a of FIG. 3. Various T-handles 15 include handle bearing walls 19 with clutch lugs 14a and 14b oriented differently than that of FIG. 3. FIG. 10a shows the orientation of the embodiment shown in FIG. 3. Guide block 70 is seen connected around coupling segment 45 of post member 38 and positioned so that block lugs 73a and 73b are located between clutch lugs 14a and 14b. Roll pin 46 is also seen resting in pin valley 74. In this embodiment, coupling segment 45 is substantially vertically oriented. In FIG. 10b, by contrast, clutch lugs 14a' and 14b' of handle bearing wall 19' are oriented so that the resulting orientation of coupling segment 45 is substantially horizontal. In the present invention, guide block 70, and thus coupling segment 45, may be oriented by the operator to adapt to either of these orientation of clutch lugs 14a and 14b. It should also be understood that other embodiments which include alternate shapes of clutch lugs 14a and 14b, as well as block lugs 73a and 73b, are within the scope of the present invention.

FIG. 11a shows a cross-sectional end view of the present invention as shown in FIG. 3, without the T-handle housing 25, barrel spring 66, or klipring 51, taken along line 11a—11a of FIG. 3. Flanged washer 55 including flange member 56 is seen connected behind cam washer 60, including leg flat surface 62, cam recess 67, and bend flat surface 61, which is connected around cam segment 44 and behind vertically oriented coupling segment 45. This orientation of cam washer 60 and flanged washer 55 is adapted for the orientations of T-handle 15 and T-handle housing 25 shown in FIGS. 9a and 10a, respectively. FIG. 11b is a cross-sectional end view similar to FIG. 11a showing an alternate orientation of flanged washer 55 and cam washer 60 which is adapted for the orientations of T-handle 15 and T-handle housing 25 shown in FIGS. 9b and 10a, respectively. FIG. 11c is a cross-sectional end view similar to FIG. 11a showing alternate orientations for use with the alternate orientations of T-handle 15 and T-handle housing 25 shown in FIGS. 9a and 10b, respectively. FIG. 11d is a cross-sectional end view similar to FIG. 11a showing alternate orientations for use with the alternate orientations of T-handle 15 and T-handle housing 25 shown in FIGS. 9b and 10b, respectively.

FIG. 11e shows a cross-sectional end view similar to FIG. 11a showing another alternate orientation of cam washer 60' and flanged washer 55 for use with the preferred orientations of T-handle 15 and T-handle housing 25 and further showing an alternate embodiment of cam washer 60'. The extended length of cam recess 67' shown in FIG. 11e provides for a greater amount of allowable rotation of T-handle 15. Cam washer 60' is shown including similarly placed leg flat surface 62 and alternately placed bend flat surface 61' resulting from the longer cam recess 67'.

Also, radial slot 65 (FIG. 6a) is not included in cam washer 60'. This distinction is useful in some arrangements because it provides greater structural integrity and enables cam washer 60' to better resist deformation due to rotational forces received through inner cam surfaces 63a and 63b. However, because there is no radial slot 65, cam washer 60' must be assembled onto cam segment 44 by passing it around one end of post member 38. Referring also to FIG. 11f briefly, FIG. 11f shows an isolated rear view of another alternate embodiment of cam washer 60'' which is very similar to the cam washer 60' of FIG. 11e. One of the differences between them is the existence of radial slot 65' which proceeds through cam washer 60'' and through inner cam surface 63a. This slot allows cam washer 60'' to be more readily assembled onto post member 38 by passing coupling segment 45 through radial slot 65', rather than the method required by cam washer 60' of FIG. 11e. Although cam washer 60' of FIG. 11e may provide more structural integrity than cam washer 60'' of FIG. 11f because of radial slot 65', the size of radial slot 65' and its placement in inner cam surface 63a enable cam washer 60' to, in some environments, provide more structural integrity than that found in cam washer 60 of FIG. 11a. Furthermore, the outer edges of radial slot 65' are rounded to prevent any binding which may be prone to occur in some environments.

Referring back to FIG. 11e, the alternate orientation of cam washer 60' and flanged washer 55 may be used when a different orientation of klipring 51 (shown in FIGS. 1 & 2) is preferred. In this alternate orientation, klipring 51 is positioned so that less of the klipring contact surfaces 53a and 53b are adjacent to flat cam surfaces 48a and 48b, thus providing more strength to the link because more radial surface contact is provided between klipring 51 and cam segment 44. In all embodiments of the present invention, flange member 56 is angled away from flange washer 55, thus interacting with klipring 51 to help insure the strongest link during the locked orientation with respect to cam segment 44. In addition, alternate shapes of klipring 51, which are also included within the scope of the present invention, affect the choice of which orientation of cam washer 60' and flanged washer 55 to employ.

Figure 12:
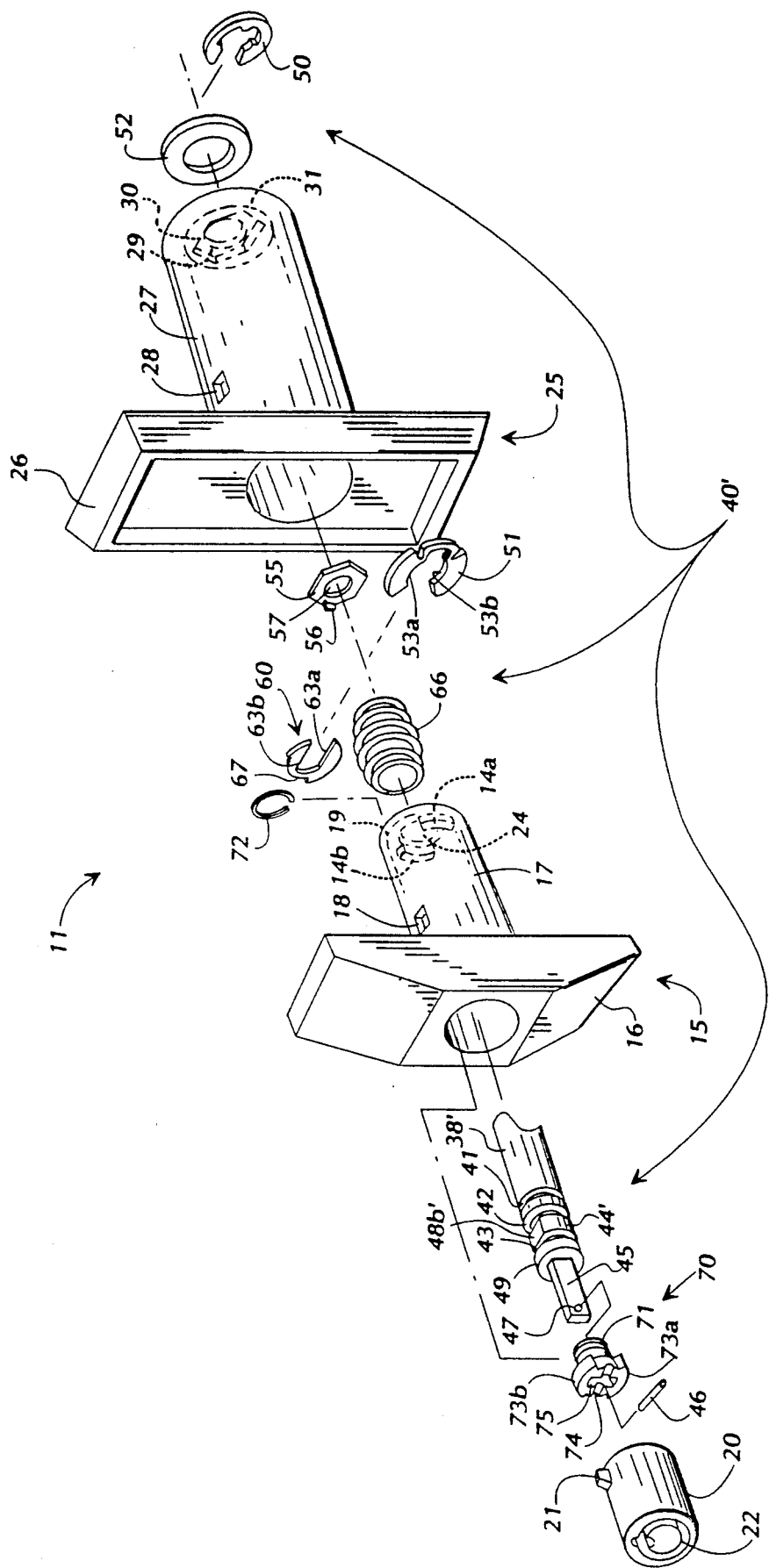
FIG. 12 is an exploded perspective view similar to FIG. 2 and shows an alternate embodiment of the front end of the post member assembly.

FIG. 12 shows an exploded perspective view which is similar to FIG. 2 and shows an alternate embodiment of the front end of post member assembly 40'. Post member 38' is seen with an alternately located cam segment 44'. Rather than being located between front groove 43 and coupling segment 45, cam segment 44', shown with flat cam surface 48b', is located between front groove 43 and middle groove 42. Also, the relative locations of klipring 51 and cam washer 60 are different from those shown in FIG. 2. In this alternate embodiment, klipring 51 maintains an equal amount of radial surface contact with the front cylindrical section 49 of post member 38' throughout different angular orientations of klipring 51. Thus unlike the preferred embodiment, the strength of the link is not affected by the angular orientation of klipring 51. Furthermore, flange member 56 is shorter, thereby avoiding contact with klipring 51, which klipring 51 consequently rotates in conjunction with post member 38 to maintain a constant angular orientation.

FIGS. 13a-15b show selected elements of yet another alternate embodiment of the present invention. FIG. 13a is an isolated side view similar to FIG. 8a of a front end of a post member 38'' and a cam pin 78; FIG. 13b is an isolated end view of the front end of the post member 38'' of FIG. 13a; and FIG. 13c is an isolated cross-sectional end view of the post member 38'' of FIG. 13a taken along line 13c—13c of FIG. 13a.

The structure and operation of the post member 38'' of this alternate embodiment are very similar to the structure and operation of the post member 38 of the preferred embodiment of FIGS. 1 & 2. The main difference between the two embodiments involves the cam segment 44' which is cylindrical, having no flat surfaces such as the flat cam surfaces 48a, 48b of the preferred embodiment. Also, the cam segment 44' includes a cylindrical cam pin pit 77 extending radially into the cam segment 44'. Additionally, a cam pin 78, having a length which is slightly greater than the depth of the cam pin pit 77, is normally positioned partially within the cam pin pit 78 and partially extending out from the cam pin pit 78.

FIG. 14 is an isolated front view of a cam washer 60'''' in accordance with the alternate embodiment of the present invention shown in FIG. 13a. The cam washer 60''' is similar to the cam washer 60' of FIG. 11e with the exception of a generally round cam central passageway 64' and a cam pin slot 80. During assembly the cam washer 60''' is passed around one end of the post member 38'' and positioned around the cam segment 44' so that the cam pin 78 is located inside the cam pin slot 80. FIG. 15a is a cross-sectional end view similar to FIG. 11a in accordance with the alternate embodiment of the present invention shown in FIGS. 13a and 14, and FIG. 15b is a cross-sectional end view similar to FIG. 15a showing another orientation of the flanged washer 55. During operation, the cam pin 78, the cam pin slot 80, and the cam pin pit 77 cooperate to rotate the cam washer 60''' in conjunction with rotation of the post member 38''.

While the embodiments of the present invention which have been disclosed herein are the preferred forms, other embodiments of the method and apparatus of the present invention will suggest themselves to persons skilled in the art in view of this disclosure. Therefore, it will be understood that variations and modifications can be effected within the spirit and scope of the invention and that the scope of the present invention should only be limited by the claims below. It is also understood that the relative dimensions and relationships shown on the drawings are given as the preferred relative dimensions and relationships, but the scope of the invention is not to be limited thereby.

I claim:

1. Latching apparatus for linking a first body and second body, said apparatus comprising:
   a handle assembly including, at least, a handle and a handle housing, said handle housing being attachable to a first body, and said handle including, at least,
      a front gripping means for receiving rotation force from an operator,
      a cylindrical handle section connected to said front gripping means and defining a cylindrical handle passage, and
      a handle bearing wall connected to said cylindrical handle section;
   a post member connected to said handle and defining a longitudinal post axis;
   an independent guide member interposed between and contacting said post member and said handle, wherein said handle bearing wall includes, at least, a handle coupling means for transferring rotation force received by said front gripping means of said handle to said guide member, and wherein said guide member includes, at least, guide coupling means for receiving the rotation force from said handle coupling means;
   a stop means located within said handle housing for defining limits of allowable axial rotation of said post member relative to said handle housing; and
   a receiving assembly means being attachable to a second body for receiving said post member to effect a link between the first body and the second body.

2. Apparatus of claim 1, wherein said handle housing includes, at least,
   a front grip recess for receiving said front gripping means of said handle,
   a middle housing section connected to said front grip recess and defining a cylindrical housing passage for receiving said cylindrical handle section, and
   a housing bearing wall connected to said cylindrical housing section.

3. Apparatus of claim 2, wherein said handle assembly further includes a lock assembly means substantially located within said cylindrical handle passage for selectively maintaining said front gripping means at least partially within said front grip recess.

4. Apparatus of claim 3, wherein said handle assembly defines one of a variety of common T-handle assemblies with associated cylinder locks.

5. Apparatus of claim 1, wherein said post member defines a fractional-turn post member.

6. Apparatus of claim 1, wherein said handle bearing wall defines an inner recess associated with said handle coupling means which defines, in cross-sectional profile, a first shape, wherein said guide member defines, in cross-sectional profile, a shape which corresponds to said first shape, and wherein said guide member is at least partially located within said inner recess so that rotational play between said handle and said guide member is substantially eliminated.

7. Apparatus of claim 1, wherein said post member includes, at least, a coupling segment defined, in cross-sectional profile, by two or more radii from said longitudinal post axis.

8. Apparatus of claim 7, wherein said guide member defines a longitudinal passageway for receiving said coupling segment of said post member and for transferring rotation force to said post member, said longitudinal passageway defining a cross-sectional profile similar to the cross-sectional profile of said coupling segment of said post member.

9. Apparatus of claim 8, wherein said cross-sectional profile of said coupling segment includes, at least, two parallel straight edges and two curved edges.

10. Apparatus of claim 8, wherein said post member further includes an end means connected to said coupling segment for maintaining a connection between said post member and said handle.

11. Apparatus of claim 10, wherein said end means defines a pin passageway at one end of said coupling segment of said post member and includes, at least, a roll pin protruding through said pin passageway.

12. Apparatus of claim 11, wherein said guide member further includes a pin valley for receiving said roll pin.

13. Apparatus of claim 1, wherein said handle bearing wall defines a rear passageway which defines a rear passageway axis, wherein said guide member protrudes through said rear passageway, and wherein said guide member further includes a guide retention means for maintaining said guide member within said rear passageway.

14. Apparatus of claim 13, wherein said handle bearing wall includes an circular recess defined by a recess radius from said rear passageway axis, wherein said guide retention means includes, at least, a circumferential retention recess and a retention ring connected to said guide member at said retention recess, wherein said retention ring is defined by an outer ring radius from said rear passageway axis which is less than said recess radius, and wherein said retention ring is located within said outer circular recess.

15. Apparatus of claim 1, wherein said post member includes, at least, a stop segment which defines a cylindrical pin pit extending into said stop segment, wherein said apparatus further comprises a stop pin located partially within the pin pit and extending partially outside the pin pit, and wherein said first washer means includes, at least, a slot means for receiving rotational force from said post member through said stop pin.

16. Apparatus of claim 15, wherein said first washer means defines a circular central passageway for receiving said stop segment of said post member and a stop pin slot for receiving said stop pin.

17. Apparatus of claim 1, wherein said handle housing includes, at least, a bearing wall defining an inner recess, and wherein said stop means is located at least partially within the inner recess.

18. Apparatus of claim 17, wherein said stop means includes, at least, a recess washer means connected to said post member and including an outer recess and a flanged washer means located at least partially within the inner recess which includes, at least, a flange member which extends longitudinally, with respect to said longitudinal post axis, and contacts said recess washer means within said outer recess.

19. Latching apparatus for linking a first body and a second body, said apparatus comprising:

a handle assembly including, at least, a handle and a handle housing, said handle housing being attachable to a first body;

a post member connected to said handle and defining a longitudinal post axis;

a stop means located within said handle housing for defining limits of allowable axial rotation of said post member relative to said handle housing, said stop means including, at least, a first washer means for receiving rotational force from said post member, whereby said first washer means axially rotates in conjunction with said post member with respect to said handle housing and a second washer means for interacting with said handle housing to limit axial rotation of said first washer means, whereby limits of allowable axial rotation of said post member are defined with respect to said handle housing; and a receiving assembly means being attachable to a second body for receiving said post member to effect a link between the first body and the second body.

20. Apparatus of claim 19, wherein said post member includes, at least, a stop segment defining at least one cam surface, wherein said first washer means defines a central passageway for receiving said stop segment of said post member, and wherein said first washer means includes, at least, an inner cam surface which partially defines said central passageway and corresponds to said at least one cam surface of said stop segment of said post member.

21. Apparatus of claim 20, wherein said first washer means further defines a radial slot which provides access from an edge of said first washer means to said central passageway.

22. Apparatus of claim 19, wherein said first washer means further includes an outer cam recess bordered by first and second stop surfaces.

23. Apparatus of claim 22, wherein said second washer means includes, at least, a flange member which extends longitudinally, with respect to said longitudinal post axis, and contacts said first washer means within said outer cam recess between said first and second stop surfaces, whereby relative rotation between said housing and said handle is restricted according to the length of said outer cam recess.

24. Apparatus of claim 23, further including a retention ring connected around said post member and interposed between said second washer means and said first washer means, said retention ring defining a radial slot wherein said flange member is at least partially located to effect relative rotation between said retention ring and said post member.

25. Apparatus of claim 23, further including a retention ring connected around said post member and adjacent to said first washer means so that said first washer means is located between said retention ring and said second washer means, said retention ring remaining in rotational engagement with said post member.

26. Apparatus of claim 19, wherein said second washer means defines an effectively circular central passageway so that said second washer means and said post member are ordinarily free to rotate with respect to each other, wherein said handle housing defines an inner housing recess defined, in cross-sectional profile, by a first geometric shape, wherein said second washer means defines an outer edge which defines, in cross-sectional profile, a shape which substantially corresponds to said first geometric shape of said inner housing recess, and wherein said second washer means is located, at least partially, within said inner housing recess.

27. Apparatus of claim 26, wherein said first geometric shape of said inner housing recess substantially defines a hexagon.

28. Latching apparatus for linking a first body and a second body, said apparatus comprising:

a handle assembly including, at least,
a handle including, at least,
a front gripping means for receiving rotation force from an operator,
a cylindrical handle section connected to said front gripping means and defining a cylindrical handle passage, and
a handle bearing wall connected to said cylindrical handle section and including, at least, a handle coupling means for transferring rotation force received by said front gripping means, said handle bearing wall defining a rear passageway, a handle housing, said handle housing attachable to a first body and including, at least,
a front grip recess for receiving said front gripping means of said handle,
a middle housing section connected to said front grip recess and defining a cylindrical housing passage for receiving said cylindrical handle section, and
a housing bearing wall connected to said cylindrical housing section, said housing bearing wall including, at least, an inner housing recess defined, in cross-sectional profile, by a hexagon, and a lock assembly means substantially located within said cylindrical handle passage for selectively maintaining said front gripping means at least partially within said front grip recess;

a fractional-turn post member connected to said handle and defining a longitudinal post axis, said post member including, at least, a cam segment which includes at least one cam surface,
a coupling segment defined, in cross-sectional profile, by two or more radii from said longitudinal post axis, and
an ends means connected to said coupling segment for maintaining a connection between said post member and said handle, said end means defining a pin passageway at one end of said coupling segment of said post member and including, at least, a roll pin protruding through said pin passageway;

a guide member interposed between said post member and said handle and protruding through said rear passageway of said handle bearing wall, said guide member including, at least,
a guide retention means for maintaining said guide member within said rear passageway,
a guide coupling means for receiving rotation force from said handle coupling means, and
wherein said guide member defines a longitudinal passageway for receiving said coupling segment of said post member and for transferring rotation force to said post member, said longitudinal passageway defining a cross-sectional profile similar to the cross-sectional profile of said coupling segment of said post member;

a stop cam assembly means connected to said post member and located within said handle housing for defining limits of allowable relative rotation between said handle and said handle housing, said stop cam assembly including, at least,
- a cam washer means connected to said cam segment of said post member for receiving rotation force from said post member through said at least one cam surface of said cam segment of said post member so that said cam washer means rotates in conjunction with said post member, said cam washer means defining a central passageway for receiving said cam segment of said post member and a radial slot which provides access from an edge of said cam washer means into said central passageway, and wherein said cam washer means includes, at least,
  - an inner cam surface which partially defines said central passageway and corresponds to said at least one cam surface of said cam segment of said post member, and
  - an outer cam recess bordered by first and second stop surfaces, and
- a flanged washer means connected to said post member and contacting said cam washer means and said housing bearing wall for transferring resistance rotation force from said handle housing to said cam washer means, said flanged washer means including, at least, a flange member which extends longitudinally, with respect to said longitudinal post axis, and contacts said cam washer means within said outer cam recess between said first and second stop surfaces, whereby relative rotation between said housing and said handle is restricted according to the length of said outer cam recess, wherein said flanged washer means further defines an effectively circular central passageway so that said flanged washer means and said post member are ordinarily free to rotate with respect to each other, wherein said flanged washer means defines an outer edge which defines, in cross-sectional profile, a shape which substantially corresponds to a hexagon, and wherein said flanged washer is located, at least partially, within said inner housing recess; and
- a receiving assembly means attachable to a second body for receiving said post member to effect a link between the first body and the second body.

29. Latch handle assembly for supporting and rotating a post member about the post member's longitudinal axis and for releasably connecting and disconnecting the post member and a receiving assembly, said handle assembly comprising:
- a handle means for transferring rotation force to a post member;
- a handle housing defining a handle area for at least partially receiving said handle means and including, at least a bearing wall defining an inner housing recess; and
- a stop means interposed between said handle housing and the post member for defining limits on allowable axial rotation of the post member relative to said handle housing, said stop means including, at least, a housing means at least partially located within said inner housing recess for receiving resistance from said handle housing.

30. Apparatus of claim 29, wherein said handle and said handle housing define a T-handle and a T-handle housing, respectively.

31. Apparatus of claim 29, wherein said stop means further includes a post means constructed so as to be connected around said post member for receiving rotation force from said post member, and wherein said housing means and said post means interact to define allowable relative rotation between said handle and said handle housing.

32. Apparatus of claim 29, further including a guide means constructed so as to be interposed between the post member and said handle for tarnsferring rotation force from said handle to the post member, said guide means defining an axially extending central passageway for receipt of the post member.

33. In a latch handle assembly of the type including a handle housing including a bearing wall defining an inner recess and a handle with a grip section for receiving rotation force from an operator and transferring the rotation force to a connected post member, the improvement comprising:
- a stop means located within the handle housing and at least partially within the inner recess defined in the bearing wall for defining limits on allowable axial rotation of the post member relative to the handle housing.

34. The improved latch handle assembly as set forth in claim 33, wherein said stop means includes, at least, a first washer means for rotating freely about the post member and receiving resistance rotation force from the handle housing, and a second washer means for rotating in conjunction with the post member and interacting with said first washer means to define limits on allowable post member rotation.

35. The improved latch handle assembly as set forth in claim 33, further comprising a guide means constructed so as to be interposed between the post member and the handle for transferring rotational force from the handle to the post member.

36. Fractional-rotation post assembly for connection to a T-handle assembly which includes a T-handle and a T-handle housing including a bearing wall recess, said post assembly comprising:
- a post member including, at least,
  - a latching portion,
  - a stop segment axially disposed from said latching portion for location within a T-handle housing, and
  - a coupling segment axially disposed from said stop segment for being coupled to a T-handle; and
- a stop means connected to said stop segment of said post member for defining limits of allowable axial rotation of said post member relative to the T-handle housing, wherein said stop means is so constructed as to be located within a bearing wall recess.

37. Assembly of claim 36, further comprising a guide block means for being interposed between the T-handle and said coupling segment of said post member for providing engaging connection between said post member and said T-handle.

38. Assembly of claim 37, wherein said assembly is constructed to retrofit a variety of common screw and nut T-handle latching systems which include T-handle housing which define smooth, stop-pin-less, rear exterior surfaces.

39. In a latching apparatus including a post member having a first end interacting with a post receiving assembly to effect a latching function, a handle member connected to a second end of the post member for rotating the post member to effect a release of the lathcing function, a handle housing through which the post member protrudes and relative to which the post member rotates, the handle housing including a hex shaped shoulder oriented in a plane perpendicular to the longitudinal axis of the post member and located within the handle housing, the improvement thereto comprising:
- a hex washer matching the hex shoulder so as to fit within the hex shoulder;
- a means for biasing said hex washer into the hex shoulder, said hex washer being incapable of significant rotation relative to the hex shoulder while said washer is within the hex shoulder;
- a recess washer for attachment around the post member to receive rotational force from the post member and interact with said hex washer to limit relative rotation of the post member relative to the handle housing.

40. Improvement of claim 39, further comprising a guide block means interposed between the handle and the post member for providing substantially continuous rotational engagement between the handle and the post member.

41. In a T-handle assembly including a T-handle with a cylindrical section, clutch lugs, and a radial lock bolt channel, a T-handle housing with a cylindrical section for receiving the cylindrical section of the T-handle, and a cylinder lock with a radial lock bolt, the improvement thereto comprising:
- a post member connected to the T-handle; and
- a guide means interposed between said post member and the T-handle for providing continuous rotational engagement between the post member and the T-handle and for, through cooperation with the post member and the T-handle, defining a limit on relative axial movement between the T-handle and the T-handle housing, the limit defined by an arrangement of the T-handle and the T-handle housing which includes the radial lock bolt extending axially, at least partially, outside of the cylindrical section of the T-handle housing.

42. Improvement of claim 41, wherein said guide means includes, at least,
- a lug means for providing continuous rotational engagement between said guide means and the clutch lugs, and
- a post passage means for providing continuous rotational engagement between said guide means and said post member.

43. Improvement of claim 41, wherein said post member includes, at least, a radial member, and said guide means includes, at least, a valley means for receiving said radial member.

44. Improvement of claim 41, wherein said post member includes a radial pin and wherein said guide means includes, at least, lug ears contacting the clutch lugs, a post passage through which the post member extends, and a pin valley, said radial pin being located within said pin valley when the radial lock bolt extends axially, at least partially, outside the cylindrical section of the T-handle housing.

45. Fractional-rotation post assembly for connected to a T-handle assembly which includes a T-handle and a T-handle housing, said post assembly comprising:
- a post member including, at least,
  - a latching portion,
  - a stop segment axially disposed from said latching portion for location within a T-handle housing, and
  - a coupling segment axially disposed from said stop segment for being coupled to a T-handle; and
- a stop means connected to said stop segment of said post member for defining limits of allowable axial rotation of said post member relative to the T-handle housing, wherein said stop means includes, at least,
  - a first washer means for receiving rotational force from said post member, and
  - a second washer means for transferring resistance from the T-handle housing to said first washer means.

* * * * *